M. M. GOBLE.
NUT LOCK.
APPLICATION FILED FEB. 9, 1914.
1,115,923.
Patented Nov. 3, 1914.
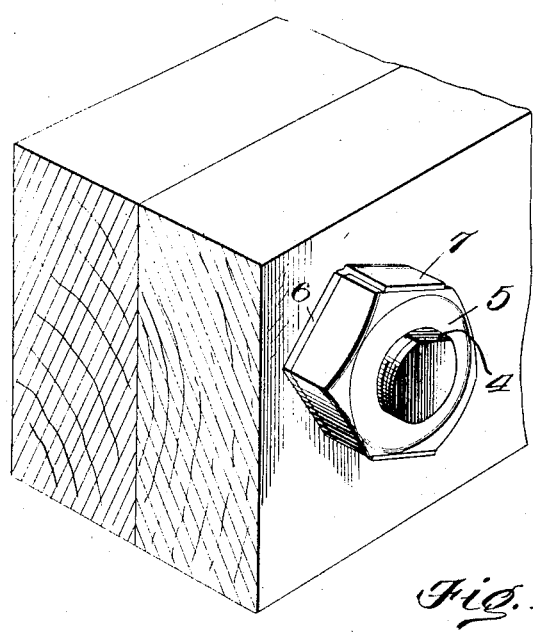
Fig. 1.
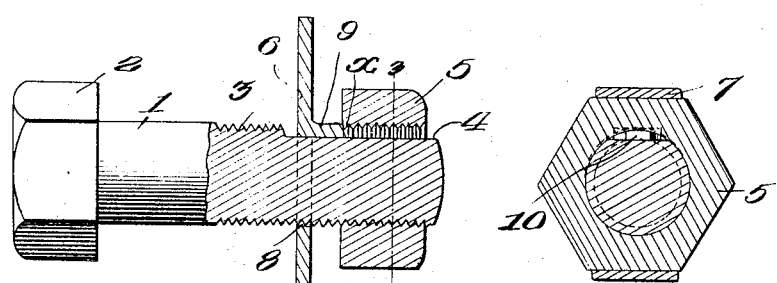
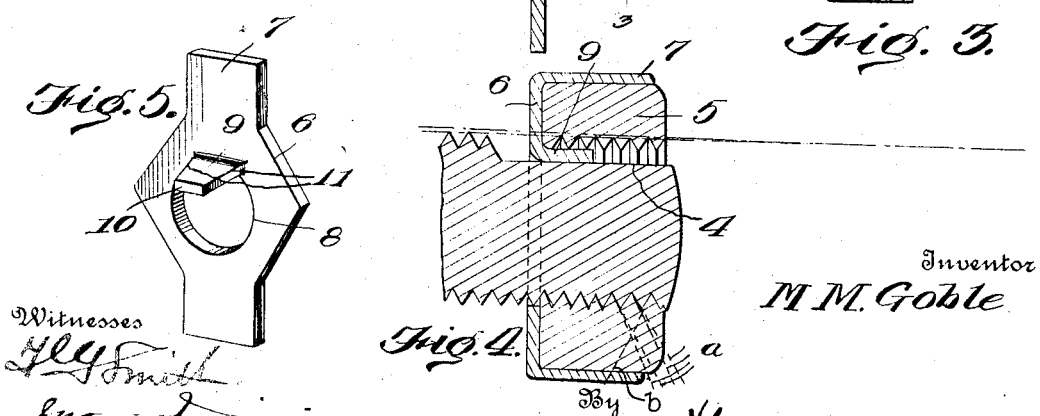
Witnesses
Inventor
M. M. Goble
By
Attorneys.

UNITED STATES PATENT OFFICE.

MILTON M. GOBLE, OF GRAND RAPIDS, MICHIGAN.

NUT-LOCK.

1,115,923.  Specification of Letters Patent.  Patented Nov. 3, 1914.

Application filed February 9, 1914. Serial No. 817,548.

*To all whom it may concern:*

Be it known that I, MILTON M. GOBLE, citizen of the United States, residing at Grand Rapids, in the county of Kent and State of Michigan, have invented certain new and useful Improvements in Nut-Locks, of which the following is a specification.

This invention relates to nut locking devices and more particularly to an improved lock washer.

I have found by actual experience that if in a nut lock structure there is any looseness of the parts, the lock will in time be destroyed when the structure is subjected to vibration. I have even found that a cotter pin passed through a nut and the bolt upon which the nut is threaded will be sheared off when the structure is subjected to vibration for any considerable length of time. However unreasonable this statement may appear, it is nevertheless true and illustrates the disastrous results of vibration. There is no doubt but that the most perfect and secure lock that could be obtained would be secured by welding the nut upon the bolt, as then vibration would positively be prevented. This manner of locking a nut upon a bolt is, however, obviously impractical.

Realizing the fact that a welded joint would be the most perfect and secure obtainable, I have aimed in the present invention to provide a nut locking device so constructed that it is only necessary, in order to lock the nut upon the bolt, to thread the nut on to the bolt and then turn down a locking tongue which engages one side of the nut, the lock washer being so constructed as to bind the nut upon the bolt in substantially as secure a manner as if welded thereon.

I am aware of the fact that there are numerous lock washers which may be applied with ease and which include, as does my lock washer, a locking tongue located at one side of the bolt opening in the washer, but so far as I am aware these locking tongues are of such form or so located that they will, more or less, loosely fit the bolt or the nut, or prevent the nut being threaded up to position against the washer in a manner to bind the washer firmly against the part to be held. That I secure a solid union of the nut and bolt is due in part to the fact that the locking tongue of the lock washer is so formed and proportioned that it will serve, in effect, as a wedge between the nut and bolt, the nut being slightly canted upon the bolt as it is turned into place. By the statement that the nut is slightly canted upon the bolt, I do not intend to imply that the bolt is distorted nor that the threads of the bolt or nut are in any way distorted or injured. In this connection I would call attention to the well known fact that in any standard nut and bolt, the nut when turned on to the bolt may be slightly rocked, and in the present invention, the wedging action referred to is the result of the nut being rocked so that the threads of the nut bind with the threads of the bolt.

In the accompanying drawings: Figure 1 is a perspective view illustrating the nut locking structure embodying the present invention. Fig. 2 is a vertical longitudinal sectional view through a bolt and nut and the lock washer of the present invention, the nut being partly threaded on to the bolt, and the said view illustrating the manner in which the nut is to coöperate with the lock washer to first feed or move the same in position against the object to be held and prior to the final tightening of the nut. Fig. 3 is a vertical transverse sectional view on the line 3—3 of Fig. 2. Fig. 4 is a view similar to Fig. 2 but exaggerated so as to illustrate the manner in which the nut is canted upon the bolt and the wedging action of the locking tongue of the washer. Fig. 5 is a perspective view of the lock washer.

Corresponding and like parts are referred to in the following description and indicated in all the views of the accompanying drawings by the same reference characters.

In the drawings, the bolt is indicated by the numeral 1 and is provided with the usual head 2 and threads 3. The bolt at one side is flattened for a greater or less portion of the length of its threaded portion 3, as indicated at 4, this flattened surface being plane.

The nut is indicated by the numeral 5 and is of the ordinary form.

The lock washer embodying the present invention comprises a body portion 6 which may be of any desired marginal contour and which is provided with one or more nut engaging tongues 7 adapted to be bent down in the manner shown in Fig. 1 of the drawings so as to engage one or more faces of the nut 5 whereby to hold the nut against rotation with respect to the washer. The washer 6 is provided with a bolt opening 8, and the material of the washer is stamped up to form a locking tongue 9 located at one side of the bolt opening. The tongue 9 has a blunt end 10 preferably straight and parallel to the plane of the body portion of the washer, or stated in other words, parallel to the line of juncture of the base of the tongue with the body of the washer. The lateral edges of the tongue 9 indicated by the numeral 11, converge in the direction of the free end of the tongue so that the tongue is substantially wedge-shape. The tongue 9 is flat upon its upper and under sides and when the washer is applied to the bolt, in the manner illustrated in Fig. 2 of the drawings, the under side of the tongue will rest flat upon the flattened surface 4 of the bolt. By reference to the said figure, it will be observed that the tongue is of a thickness slightly greater than the depth of the cut away or flattened portion of the bolt. More specifically speaking, the circle described by the edges of the thread of the bolt barely touches the upper side of the locking tongue, as indicated clearly in dotted lines in Fig. 3 of the drawings. Stated in other words, the upper side of the locking tongue is tangential, or substantially tangential to the said circle as distinguished from being chordal thereto. It will also be observed by reference to Fig. 2 of the drawings, that the locking tongue is of a length less than the length of the bolt opening in the nut 5.

In assembling the parts, the bolt is fitted through the members to be secured and the washer is then fitted on to the end of the bolt with the tongue 9 resting against the flattened side 4 of the bolt. The nut is then applied to the end of the bolt and turned in a manner to thread the same on to the bolt. In turning the nut, that face thereof which is presented toward the lock washer, comes in contact with the free or blunt end of the locking tongue 9, in the manner shown in Fig. 2 of the drawings, and by reason of such engagement, the washer will be fed or moved along the nut in the direction of the parts to be secured, and until it rests against one of said parts, as for example, a fish plate or the like. The nut is then further turned and inasmuch as the washer is firmly held against the said part to be secured, the threads of the nut will cut into the upper side and edges of the locking tongue. As the threads of the nut ride upon the end of the locking tongue, the nut will be canted to a slight degree, as illustrated in Fig. 4 of the drawings, due to the fact that the locking tongue acts as a wedge beneath the upper side of the bolt opening at and adjacent the point $x$ in Fig. 2. The lines $a$ in Fig. 4, which are continuations of the lines defining the surfaces of the threads, indicate the manner in which the nut is canted, so that at one side the threads of the nut and bolt are substantially out of contact while their other sides, indicated at the line $b$ are in firm contact and bind each other. Due to the fact that the locking tongue is of a length less than the length of the bolt opening in the nut, this wedging action will be maintained even when the nut has been threaded to position firmly against the face of the washer. This, however, would not be likely to be the case if the tongue were of the same length as the bolt opening in the nut. Furthermore, the wedging action just referred to is enhanced by reason of the fact that the sides or lateral edges 11 of the locking tongue are converged in the direction of the free end of the tongue.

As concerns the initial engagement of the nut against the blunt end of the locking tongue in the manner shown in Fig. 2, as the nut is rotated into place, it may be stated that by reason of this construction, it is unnecessary to firmly bind the lock washer against the part to be held as the nut is threaded on to the bolt; the washer is loosely disposed upon the bolt, and the nut is turned into place in the ordinary manner and without any further attention being given the washer. Obviously, this structure differs from one in which the thickness of the tongue would be less than the depth of the cut away portion, or, in other words, in which the upper surface of the tongue would be chordal to the circle described by the edges of the threads of the bolt. I have tested such a structure and find that it presents the disadvantage that when the nut is rotated, it will not feed the washer along the bolt but the threads of the nut will engage with the tongue and bind and cut into the same, locking the nut and washer before the washer has assumed a position in engagement with the part to be secured. I have also found that even if the washer is moved by hand along the bolt and securely held against the part to be secured and the nut is then turned into place, the washer will not be so firmly held against the said part as to withstand vibration.

Having thus described the invention, what is claimed as new is:

1. A lock washer having a bolt opening and provided at one side of the said opening with a locking tongue having its outer side substantially parallel to the axis of the opening and substantially tangential to the circle described by the wall of the bolt opening.

2. The combination with a bolt having a flattened side, of a lock washer having an opening to receive the bolt and provided at one side with a locking tongue having a blunt end, the said tongue being designed to rest against the flattened side of the bolt and being of a thickness greater than the greatest distance between the flattened side of the bolt and the circle described by the edges of the threads of the bolt at the said flattened side of the bolt.

3. A lock washer having a bolt opening and provided at one side of the said opening with a locking tongue having its outer side substantially parallel to the axis of the opening and substantially tangential to the circle described by the wall of the bolt opening, the lateral edges of the said tongue being converged in the direction of the free end of the tongue.

4. The combination with a bolt having a flattened side, of a lock washer having an opening to receive the bolt and provided at one side with a locking tongue, the locking tongue having a blunt end and being designed to rest against the flattened side of the bolt and being flat upon both sides and having its outer side located exteriorly of the circle described by the threads of the bolt, whereby threads will be automatically cut in the outer side of the locking tongue by the threads of a nut when the nut is turned onto the bolt.

In testimony whereof I affix my signature in presence of two witnesses.

MILTON M. GOBLE. [L. S.]

Witnesses:
SAMUEL N. ACKER,
J. D. YOAKLEY.